(12) United States Patent
Kawakami

(10) Patent No.: US 6,883,530 B2
(45) Date of Patent: Apr. 26, 2005

(54) NONSLIP WALKING STICK REST

(76) Inventor: Tetsuji Kawakami, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 10/661,605

(22) Filed: Sep. 15, 2003

(65) Prior Publication Data

US 2005/0055977 A1  Mar. 17, 2005

(51) Int. Cl.[7] .............................................. A45B 9/04
(52) U.S. Cl. ..................... 135/84; 135/82; 248/188.9
(58) Field of Search ................................... 135/82, 84

(56) References Cited

U.S. PATENT DOCUMENTS

| | | | | |
|---|---|---|---|---|
| 679,468 A | * | 7/1901 | Pratt | 135/84 |
| 765,984 A | * | 7/1904 | Morris et al. | 135/84 |
| 1,348,531 A | * | 5/1920 | Amadio | 135/82 |
| 2,910,995 A | * | 11/1959 | Jacuzzi | 135/77 |
| 3,099,103 A | * | 7/1963 | Wright | 248/188.8 |
| 4,440,186 A | * | 4/1984 | Lottner | 135/84 |
| 4,510,957 A | * | 4/1985 | Frank | 135/84 |
| 4,947,882 A | * | 8/1990 | Levasseur | 135/84 |
| 6,138,699 A | * | 10/2000 | Su | 135/82 |

* cited by examiner

Primary Examiner—Robert Canfield

(57) ABSTRACT

A nonslip walking stick rest disposed at a lower end of a walking stick, is characterized that, the walking stick rest is provided with a pliable plastic tray having a nonslip surface at a lower housing; the lower housing has a spherical recess provided with a shaft having a sphere at an interior thereof above the lower housing is a fixed middle housing; the shaft is provided with an upper housing; a spring is disposed at the upper portion of the shaft, and between the upper housing and the middle housing; and the upper housing has an insertion end for inserting to the lower end of the walking stick. When the walking stick is propped on the ground, the lower housing of the walking stick rest is capable of automatic adaptations for staying closely to the ground and preventing slipping.

1 Claim, 4 Drawing Sheets

NONSLIP WALKING STICK REST

BACKGROUND OF THE INVENTION

1. Field of the Invention

The invention relates to a nonslip walking stick rest, and more particularly, to a nonslip walking stick rest disposed at a lower end of a walking stick. The nonslip walking stick rest comprises a lower housing, a middle housing and an upper housing, and is provided with a spherical shaft between the lower housing and the upper housing, such that the lower housing stays closely to the ground by adapting and adjusting to different angles in order to prevent slipping.

2. Description of the Prior Art

A walking stick used by the elderly or physically challenged usually has a rubber walking stick rest at a lower end thereof. The walking stick rest is for providing nonslip effects when the walking stick is propped on the ground.

However, the prior walking stick rest is an integral structure, and is incapable of tilting to adapt to different angles of the ground. When the ground which receives the walking stick has a larger angle, a contact area between a lower plane of the walking stick rest and the ground becomes smaller. The smaller the contact area is, the smaller an interference area between the lower plane of the walking stick rest and the ground gets. Therefore, slipping of the walking stick is often resulted. The prior structure offers rather insufficient safety for that a person may easily fall due to the slipping described above.

SUMMARY OF THE INVENTION

In the view of the aforesaid shortcomings of the prior structure, a primary object of the invention is to provide a walking stick rest disposed at a lower end of a walking stick, wherein the walking stick rest comprises a lower housing, a middle housing and an upper housing. Between the lower housing and the upper housing is a shaft having a sphere, such that the lower housing is capable of adapting to different angles to stay closely to the ground in order to prevent slipping.

According to the invention, a walking stick rest disposed at a lower end of a walking stick is characterized that, at a lower housing, the walking stick rest is provided with a pliable plastic tray having a nonslip surface; at an upper portion of the lower housing is a spherical recess; the spherical recess is disposed with a shaft having a sphere at an interior thereof, and a cover plate at an upper portion thereof; above the lower housing is a fixed middle housing; the shaft is provided with an upper housing at an upper portion thereof; a spring is disposed at the upper portion of the shaft, and between the upper housing and the middle housing; and the upper housing has an insertion end at an upper surface thereof, wherein the insertion end is for inserting to the lower end of the walking stick. When the walking stick is propped on the ground, the lower housing of the walking stick rest is capable of automatic adaptations for staying closely to the ground and thus preventing slipping.

DETAILED DESCRIPTION OF THE PREFERRED EMBODIMENTS

To better understand the invention, detailed descriptions shall be given with the accompanying drawings below.

Figure 1:
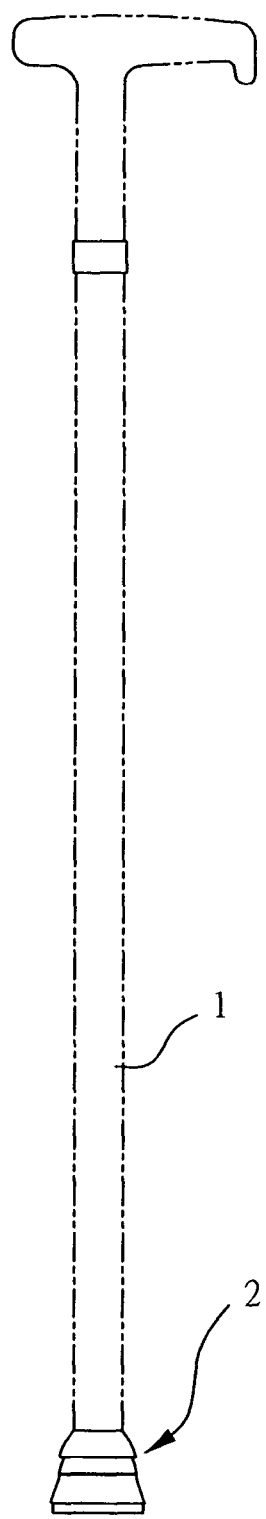
FIG. 1 shows a schematic view illustrating the invention being disposed at a lower end of a walking stick.
Figure 2:
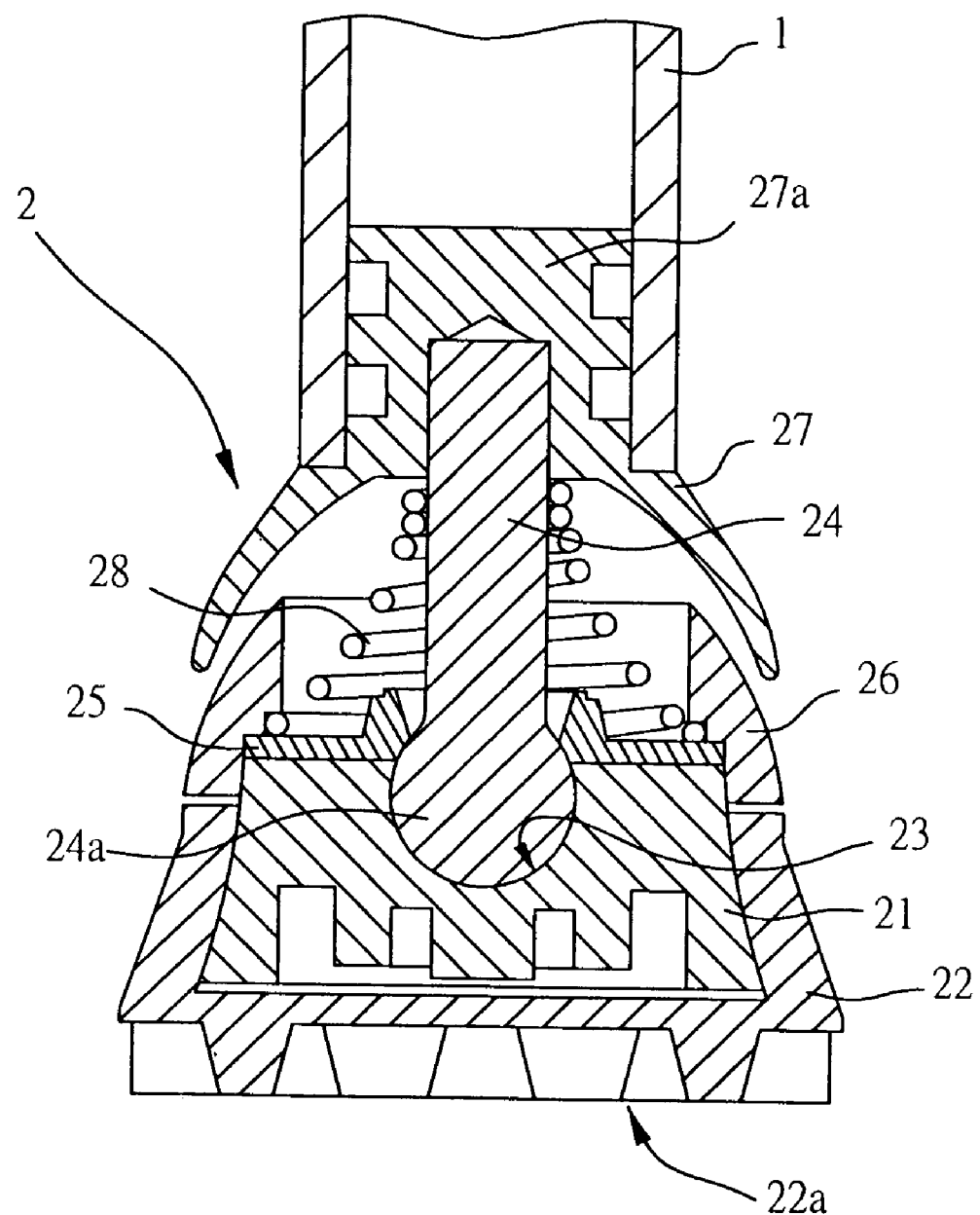
FIG. 2 shows a sectional view according to the invention.

Referring to FIGS. 1 and 2, the invention comprises a walking stick rest at a lower end of a walking stick 1.

Figure 3:
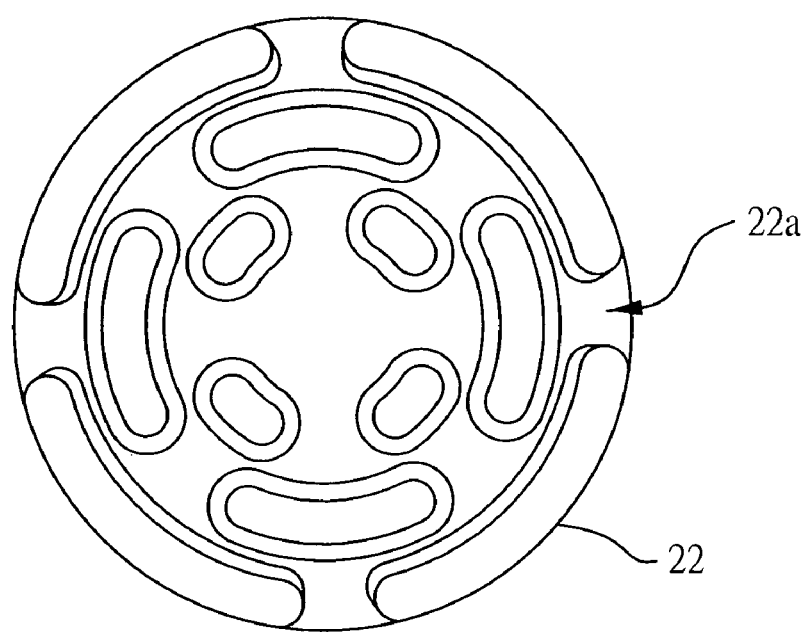
FIG. 3 shows a bottom view of a plastic tray according to the invention.

The invention is characterized that, at a lower housing 21, the walking stick rest 2 is provided with a pliable plastic tray 22 having a nonslip surface 22a as shown in FIG. 3. At an upper portion of the lower housing 21 is a spherical recess 23. The spherical recess 23 is disposed with a shaft 24 having a sphere 24a at an interior thereof, and a cover plate 25 at an upper portion thereof. Above the lower housing 21 is a fixed middle housing 26. The shaft 24 is provided with an upper housing 27 at an upper portion thereof. A spring 28 is disposed at the upper portion of the shaft 24, and between the upper housing 27 and the middle housing 26. The upper housing 27 has an insertion end 27a at an upper surface thereof. The insertion end 27a is for inserting to the lower end of the walking stick 1.

Figure 4:
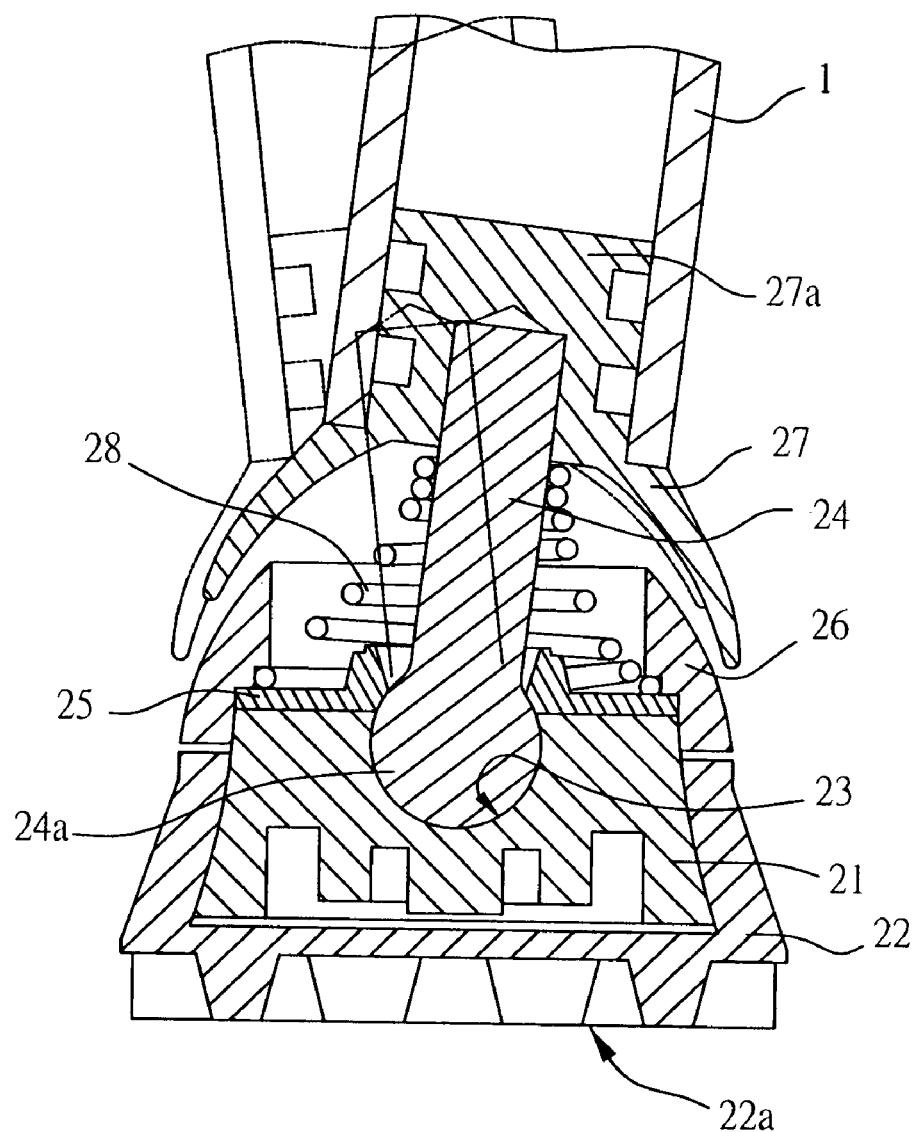
FIG. 4 shows an operating view according to the invention.

According to the aforesaid structure, the walking stick rest 2 comprises the lower housing 21, the middle housing 26 and the upper housing 27. Between the lower housing 21 and the upper housing 27 is a shaft 24, and the sphere at the lower end of the shaft 24 is universally disposed in the spherical recess 23 at the lower housing 23, such that the lower housing 21 is capable of omni-directional rocking movements. When the walking stick 1 is propped on the ground, the lower housing 21 of the walking stick rest 2 automatically rocks in connection with the ground as shown in FIG. 4. Thus, the plastic tray 22 disposed at the lower portion of the lower housing 21 is completely adhered to the ground, thereby providing better nonslip effects and enhanced safety for preventing slipping of the walking stick 1.

When the walking stick 1 is lifted away from the ground, the lower base 21 of the walking stick rest 2 is automatically repositioned to a center position using elasticity of the spring 28. When the walking stick 1 is propped on the ground, the walking stick rest 2 is again completely adhered to the ground, so that the plastic tray 22 at the lower portion of the lower housing 21 of the walking stick rest 2 is capable of adaptations for staying closely to the ground.

In addition, for that the lower surface of the plastic tray 22 is further provided with the nonslip surface 22a, nonslip effects are again reinforced for providing even better usage safety.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A nonslip walking stick rest disposed at a lower end of a walking stick, being characterized that:

at a lower housing, the walking stick rest is provided with a pliable plastic tray having a nonslip surface; at an upper portion of the lower housing is a spherical recess; the spherical recess is disposed with a shaft having a sphere at an interior thereof, and a cover plate at an upper portion thereof; above the lower housing is a fixed middle housing; the shaft is provided with an upper housing at an upper portion thereof; a spring is disposed at the upper portion of the shaft, and between the upper housing and the middle housing; and the upper housing has an insertion end at an upper surface thereof, wherein the insertion end is for inserting to the lower end of the walking stick.

* * * * *